Patented June 19, 1945

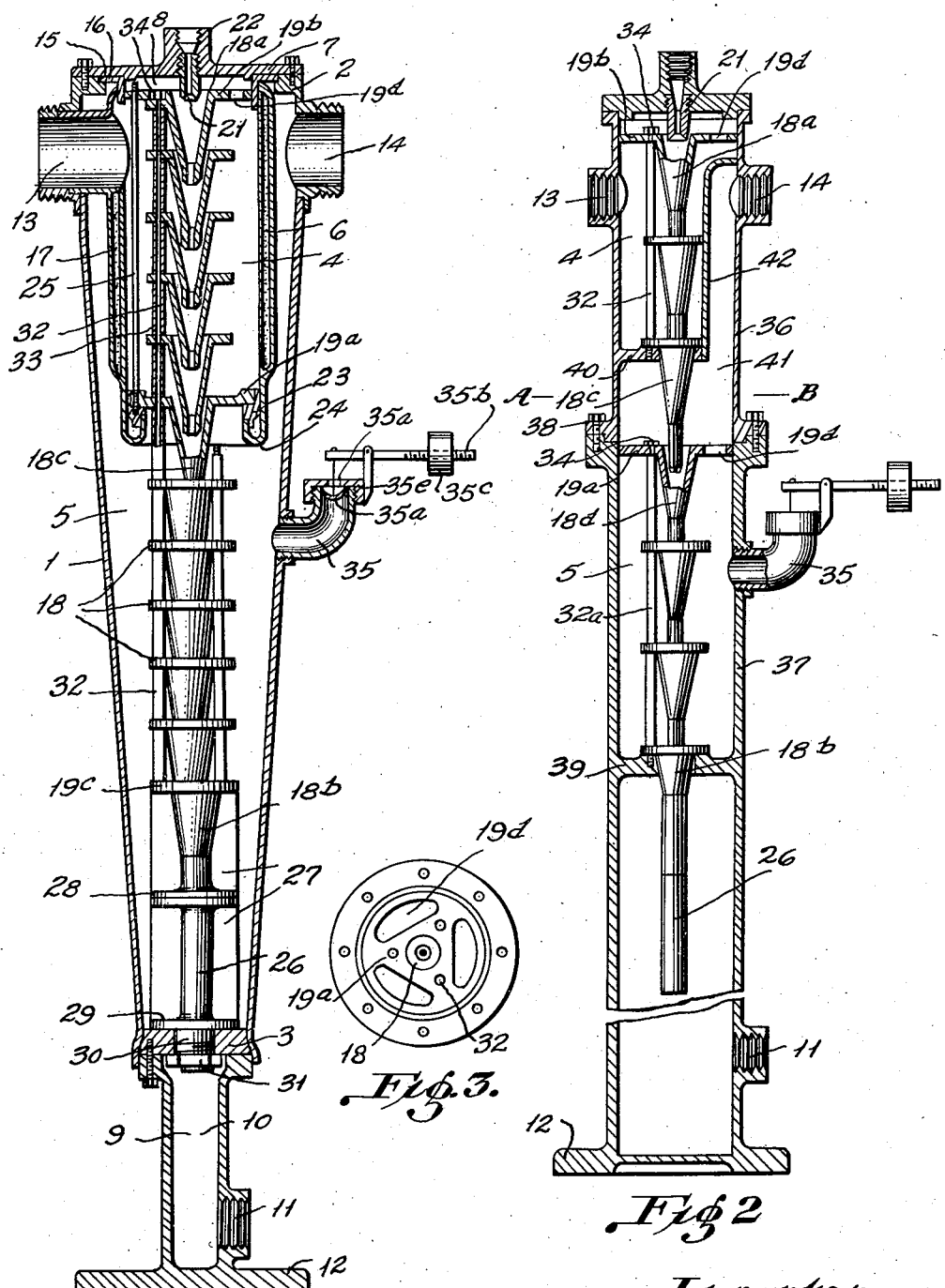

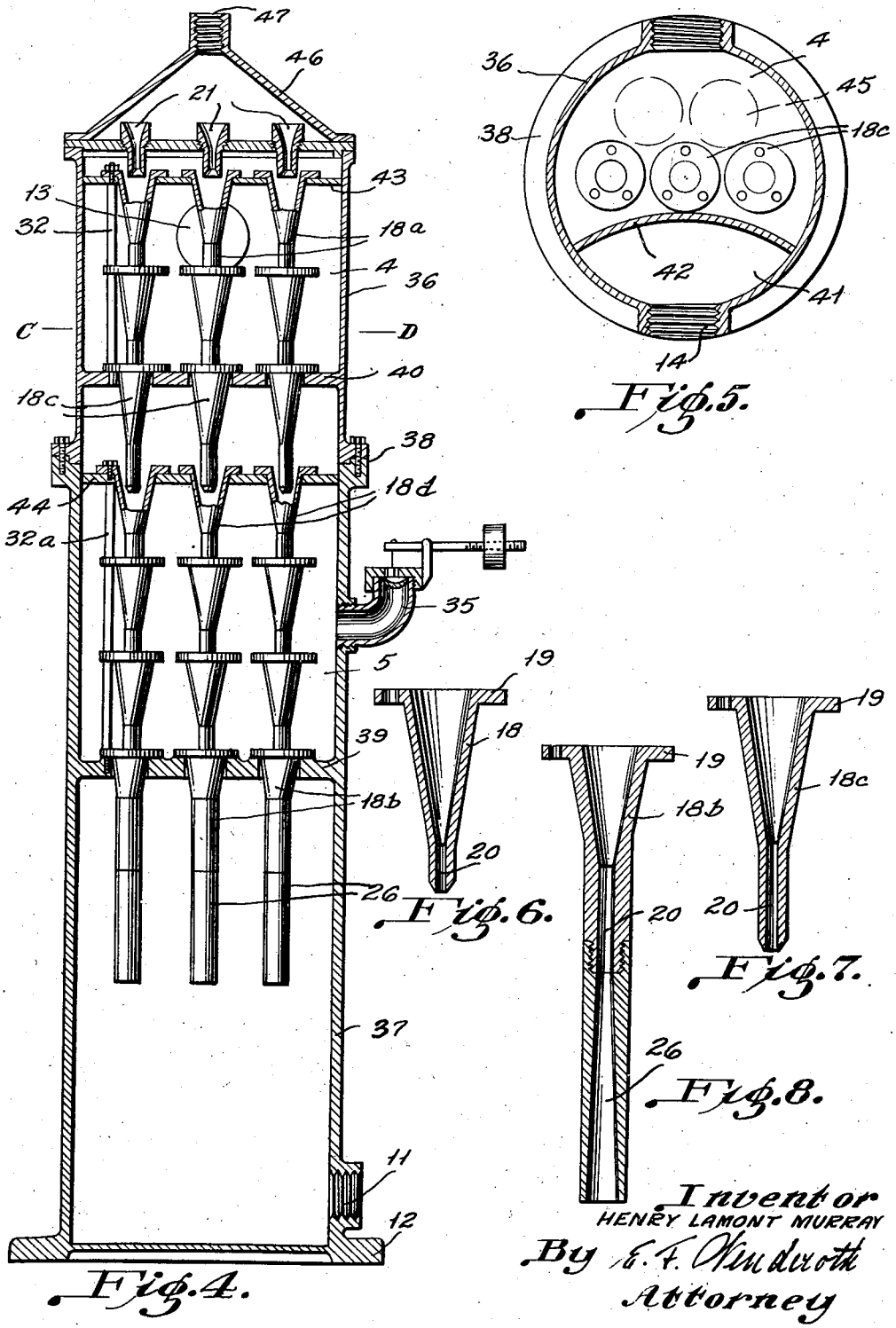

2,378,425

UNITED STATES PATENT OFFICE 2,378,425

EJECTOR-CONDENSER

Henry Lamont Murray, Epsom, Auckland, New Zealand

Application November 22, 1941, Serial No. 420,122
In New Zealand, Australia, and Great Britain
February 22, 1938

12 Claims. (Cl. 230—103)

This application is a continuation-in-part of my co-pending application Serial No. 257,013 filed February 17, 1939, patented Mar. 23, 1943, No. 2,314,455, and consists in large measure of subject matter which is divided out of and unclaimed in the said co-pending application.

My invention relates to apparatus for the production and maintenance of sub-atmospheric pressures and more particularly to condensing and/or exhausting means which employ the well-known liquid jet principle of operation. The condensing and/or exhausting means, the subject matter of the present invention will hereinafter, for the sake of brevity, be referred to as a "manifold condenser."

The use of both surface and jet condensers has long been known, wherein the degree of vacuum generated is common throughout the condenser unit. Such refinement has been reached in the design of those condensers that high efficiencies in the condensers themselves are obtained. However, where the several parts of an assembly require different degrees of vacuum, it has hitherto been necessary, in the absence of complicated intermediary equipment, to employ a separate single-stage condenser to generate each different degree of vacuum required.

Obviously where more than one degree of vacuum is demanded, this requirement increases appreciably the first cost of the installation, an increase which may be of such importance as to result in drastic curtailment of the utilisation of the equipment. For example, in my said co-pending application out of which this application is carved in part, there is disclosed the combination of a deodoriser and cooler for the treatment of lacteal fluids, each of which operates under a different degree of vacuum. Prior to my development of the principles of my condenser disclosed herein, I was required to employ a separate and independent condenser for each element of the assembly. Following the production of my new invention according to this application, however, I was enabled to re-design the assembly, to employ only one condenser to produce simultaneously the required different degrees of vacuum for the several elements of the assembly. As a result thereof, I have achieved appreciable saving both in first cost and in operating and maintenance costs.

It was to avoid the increased cost of and complication attendant upon the use of a separate condenser with each vacuum stage of complicated assemblies, as well as to meet the exigencies of modern-day high-pressure competition in the varied fields of industrial equipment, that I gave careful study leading towards the evolution of my new manifold condenser. Its production has made possible the simplified design of many diversified types of industrial vacuum equipment, and has so reduced the costs thereof that the acceptance of such equipment in the arts and industries has been much more widespread than has hitherto been the case. My new manifold condenser can readily be designed to provide within wide limits, any required degrees of vacuum; and these desired degrees of vacuum can be obtained with comparatively slight structural variation of the condenser, and with no change in its fundamental design.

Accordingly my new manifold condenser may be said to embody, inter alia, the following advantages and features:

1. The ability under load to simultaneously produce and maintain diverse degrees of sub-atmospheric pressure in isolated zones within the one apparatus.

2. The provision within the one apparatus of separate zones for simultaneously generating diverse degrees of sub-atmospheric pressure, each zone being capable of functioning independently of any other zone of lower vacuum within the apparatus while serving to exhaust a given unit of plant.

3. The ability of any one or more vacuum generating zones to continue functioning efficiently despite the free admission of air to a zone of lower vacuum.

4. The employment of one or more high velocity liquid jets common to all vacuum generating zones within the apparatus.

5. The recurring use of the same jet liquid during its once-through traverse of the separate zones of the apparatus.

6. Ease of construction in multiple jet form when required for high capacity duty.

7. The combined attributes of extreme simplicity, compactness, low first cost, low cost of operation, absence of moving and wearing parts, extreme economy of operating liquid, flexibility, adaptability, together with the synchronous operation of the independent zones of the apparatus in performing their duties.

An object of my invention accordingly consists in the provision of a new form of condenser capable of generating simultaneously several different degrees of vacuum separate and independent of each other, which condenser is characterised by its extreme simplicity, its high efficiency, compactness, sturdiness, low first cost, and low cost of operation and maintenance.

Another object is to produce a manifold ejector condenser, either simple or compound, of the type set forth generally in the foregoing, and characterised by its maximum utilisation of water or other fluid to produce the required condenser action.

Yet another object is to produce a jet type of ejector condenser employing one or more water columns as the activating element, in which is maintained the highest practicable ratio of exposed area of the water to its volume, and which provides large capacity with minimum investment.

Accordingly, my invention consists in the various elements and features of construction, and in the operational steps, and in the combination and relation of each of the same with one or more of the others, all as more fully described hereinafter in connection with the accompanying drawings, wherein are depicted, solely by way of illustration and not by way of limitation, several embodiments of my invention which I prefer at present.

Figure 1 shows a partially sectioned elevation of one embodiment of my single jet manifold condenser of compound type suitable for construction in sheet metal.

Figure 2 shows a partially sectioned elevation of an alternative embodiment having modified means for effecting the isolation of the vacuum generating zones, suitable for construction in cast metal.

Figure 3 is a sectional plan view on line A—B of Figure 2.

Figure 4 shows a sectional elevation of a modified form of compound apparatus for high capacity duty, applying multiple jets and multiple assemblies of guide cones.

Figure 5 is a plan view on line C—D of Figure 4.

Figure 6 shows a sectional elevation through one of the standard guide cones 18.

Figure 7 shows a sectional elevation through a zone sealing cone 18c, and

Figure 8 shows a sectional elevation through one type of final sealing cone 18b with its Venturi discharge tube 26.

In the apparatus the number of guide cones and the length of jet allocated to each vacuum zone or chamber can be varied, within limits, in accordance with the duty required of each zone: i. e., the amount of gas and/or vapour which must be dealt with in order to maintain the specific degree of vacuum desired.

Owing to the absorption of heat from condensed vapour, the jet temperature is increased during its passage through each zone. In order therefore to ensure an effective temperature difference between the jet and the vapour to be condensed, the first zone—which receives the coolest water—should be employed for generating the highest vacuum desired, the second zone for the next highest vacuum, and so on.

In any given embodiment of my invention, each vacuum generating zone of the manifold condenser, is contrived to maintain a given degree of vacuum under a given load. Should the load become less, the degree of vacuum will rise above the desired point. Where desirable to stabilise the vacuum therefore, I employ snifter valve means which compensates for the reduction in load by bleeding air into the generating zone concerned.

In that the component zones or chambers of the apparatus do not cooperate to produce a given peak vacuum, the apparatus is not multistage in character.

In that the number of component zones is not limited to two only, the apparatus is not compound, in the sense in which this term is used in the art.

In the manifold condensers as shown in Figures 1, 2 and 4, the ejector features disclosed in our previous U. S. Letters Patent Nos. 1,641,349 and 1,864,809, as described in further detail hereinbefore, are employed, but I have so contrived that different intensities of vacuum are simultaneously obtainable from the one condenser apparatus. Such modification is in the main achieved by isolating within separate chambers, groups of guide cones through which a common jet passes.

Though the drawings illustrate embodiments of compound character having two vacuum generating zones only, other embodiments may be of multi-zone type having three or even more zones, provided that the pressure of water issuing from the inlet nozzle is sufficient to overcome the combined friction of the cone throats, plus the external atmospheric pressure against which the ejector has of course to discharge.

Referring now to Figure 1, a vertical positioned casing 1 of sheet metal incorporating hermetically attached head 2 and a base 3 is provided for housing the condenser elements.

While casing 1 may be of any suitable shape, it is shown as having the general form of a truncated cone, tapering from its inlet end to its lower or outlet end. In the embodiment shown I prefer to use this form when constructing from high priced or light gauge material such as stainless steel as it saves metal and imparts greater strength than would be the case with a cylindrical form.

The space within the casing 1 is divided into two vacuum generating zones 4 and 5, the upper zone 4 being that within an annular chamber 6 and the lower zone 5 being that within the casing 1 but external to the annular chamber 6. The cross sectional areas of the vacuum generating zones 4 and 5 should be such as to allow low velocity access of the vapours to the jet.

A jointed cover plate 7 is provided for closing a large opening 8 in the head 2 which cover plate 7 is fastened to the head 2 in any desired convenient manner as by means of studs or nuts. The opening 8 provides access to the interior of the condenser for assembling the elements thereof and for inspection.

Casing 1 is mounted in any suitable manner as upon hollow cast pedestal 9 bolted or otherwise suitably secured to the base 3. The hollow bore 10 of the pedestal 9 serves to conduct the jet liquid from the casing 1 to drain pipe connection 11 provided at the side of the pedestal 9. This pedestal 9 has a flanged foot or base 12 preferably of stout construction to provide an adequate support for the apparatus.

Located in the head 2 of casing 1 are two vapour inlet ports 13 and 14 of areas adequate for the passage of the incoming vapours and so constructed as to provide convenient connection to the units of plant to be exhausted by the condenser. The vapour inlet port 13 is connected through the head 2 to the annular chamber 6 and provides access for vapour to the upper zone 4 of the condenser. The other inlet port 14 provides access for vapour to the lower zone 5 of the condenser. Obviously port 14 could be located anywhere on the conical casing 1, but it is usually desirable for both ports 13 and 14 to be on the same plane, although not necessarily opposite each other as shown.

An annular recess 15 is provided in the top interior circumference of the head 2 which defines the opening 8. The recess 15 serves to receive and support the flange 16 which forms the upper end of the annular chamber 6 which may or may not be surrounded by an insulated jacket 17. The flange 16 is jointed and fastened by countersunk screw means (not shown) into the recess 15.

The active elements of the condenser take the form of a set of inverted nested cones 18, disposed in spaced relation to each other and aligned on their vertical axis longitudinal of the condenser. Each of the cones 18 is formed with a circular flange 19 at the base thereof and a parallel throat orifice 20 at the apex (see Figure 6). To provide for the progressive expansion of the jet liquid—approximately 22% per foot in the case of the embodiment being considered—the areas of the cone orifices increase in harmony with the jet from that of the first cone 18a to that of the last cone 18b. An inlet nozzle 21 is threaded or otherwise secured in a boss 22 disposed centrally on the cover plate 7 in alignment with the said cone assembly.

The function of the annular chamber 6 is to enclose the zone 4 isolated from the remaining zone 5 within the casing 1. The two zones 4 and 5 thus in effect serve as separate vacuum generating regions of the same condenser, employing in common the same jet of water or other liquid from nozzle 21 but otherwise functioning independently of one another.

Located within each zone 4 and 5 is a group of the cones 18, the number apportioned to each zone being roughly proportional to the duty required of each zone as previously explained in the preamble hereto.

To the base of the annular chamber 6 is attached an internal flanged ring 23, the sheet metal wall of the chamber 6 being curved inward in U section 24 to receive same.

The purpose of this curved portion 24 is to provide flexibility of construction so as to allow for variations in expansion and contraction of the elements without causing malalignment through distortion. To ring 23 the flange 19a of sealing cone 18c is jointed and fastened by the shouldered extension screws 25, the flange 19a being of sufficient diameter to permit of this. For reasons of accessibility the extension screws 25 pass up through holes in the flange 19b of first cone 18a and terminate in squared ends 25a.

The first or top cone 18a of the assembly has its flange 19b of such diameter as to provide a neat sliding fit inside the chamber flange 16. This arrangement serves to centralise the alignment of the cone assembly in harmony with the nozzle 21. The flange 19b of cone 18a has ports 19d through it to allow the passage of vapour, similar to those shown in Figure 3.

The sealing cone 18c has a throat orifice 20 (Fig. 7) which is longer than those of the other cones. Its orifice 20 is the only means of communication between the zones 4 and 5 and in operation is sealed by the jet.

The last or bottom cone 18b of the assembly has attached to its throat a Venturi discharge nozzle 26. The cone 18b and nozzle 26 are webbed at 27 to give added strength so that when assembled they can support the nest of cones.

For structural convenience I prefer to form this cone 18b and nozzle 26 in two parts superimposed in threaded engagement and having flanged contacting faces 28. The bottom end of the webbed Venturi discharge nozzle 26 is flanged at 29 and jointed to the base 3, and has a threaded extension 30 whereby the flange 29 is drawn tight on to its jointing by means of nut 31.

Into the upper flange 19c of cone 18b are screwed preferably three shouldered locating rods 32 set equidistant to each other and concentric to the axis of the cone assembly. These rods 32 pass with minimum clearance through similarly located holes in the flanges of the other cones, which are spaced at desired intervals and in true horizontal planes by means of distance sleeves 33 mounted on the rods 32. The rods 32 just project through the flange 19b of the first cone 18a and terminate in threaded portions whereon nuts 34 serve to hold the complete cone assembly firmly clamped in aligned position.

Mounted in convenient position on casing 1 is snifter valve means 35 connected to the lower vacuum zone 5 and consisting of an internally seated valve 35a connected axially by a Bowden wire to end of fulcrum lever 35b carrying a suitable weight 35c in adjustable location. Ports 35d in valve housing 35e admit atmospheric pressure to the valve 35a. By suitably locating the position of the weight 35c on the fulcrum lever 35b, the vacuum within the zone 5 may be checked from exceeding the degree desired, by the automatic admission of air due to a state of equilibrium being reached between the mechanical leverage of the weight 35c and the atmospheric pressure upon the valve 35a.

In the alternative embodiment shown in Figure 2 there are also two separate vacuum generating zones 4 and 5 with their respective vapour inlet pipes or ports 13 and 14 but for reasons of accessibility and simplicity of construction in cast metal the upper portion 36 of the condenser is made detachable from the lower portion 37 by constructing the casing 1 in two sections, jointed in approved fashion as by flanged joint 38. The upper portion 36 contains the zone 4 and part of zone 5 while the lower portion 37 contains the remainder of zone 5 terminating at bulkhead 39, and also serves to receive the discharged jet for delivery to waste via drain connection 11 as well as serving to support the condenser and any units of plant which may be mounted thereupon.

The upper vacuum generating zone 4 which embraces vapour inlet port 13 is isolated from the lower zone 5 partly by means of a division or bulkhead 40 which projects from the wall of the upper condenser portion 36. This bulkhead 40 has a large port 41 therein for the passage of vapour. Bordering the port 41 and extending upwards to embrace the vapour inlet port 14 is a partition 42 which is attached by soldering or suitably secured round its margin. The partition 42 completes the isolation of zone 4 and together with the wall of the upper condenser portion 36 serves to provide a passage-way to the lower zone 5 for vapour entering via port 14.

As in the case of Figure 1 the port 14 could be located anywhere on the casing of zone 5 but is shown on the same plane as port 13 for the reason mentioned when discussing Figure 1.

Similar methods for aligning, mounting and spacing the cone assembly are employed as in the case of Figure 1. As constructed in Figure 2, however, each zone has independent locating rods 32 and 32a which are screwed into bulkheads 40 and 39. The first cones 18a and 18d in each zone 4 and 5 are of flanged type similar to cone 18a in Figure 1 for providing alignment and also have ports 19d (Figure 3) for the passage of vapour. The first cone 18a and the cone 18d are suspended by their flanges 19a and 19b the which are jointed to the respective bulkheads 39 and 40 and held firm thereon by locating rods 32 and 32a and nuts 34 and 34a. Not being required to provide any support for the cone assembly, the cone 18b and Venturi discharge outlet 26 are in this case not webbed.

In the multiple jet embodiment shown in Figure 4 there are again two separate vacuum generating zones 4 and 5 with their respective vapour inlet ports 13 and 14 (Figure 5) the which could of course be located anywhere that would serve to independently admit the vapours to the respective zones 4 and 5.

As in the case of the condenser shown in Figure 2 the multiple jet condenser is constructed in two portions 36 and 37 and the vacuum generating zones 4 and 5 are isolated in a similar manner, a partition 42 (Figure 5) being again employed.

In the embodiment shown there are three nozzles 21 which enables liquid to be introduced under pressure to an equal number of separate cone assemblies aligned thereto, said cone assemblies being in all respects constituted as in the case of Figure 2 with the exception that the first cones 18a and the cones 18d are in each case mounted in common alignment plates 43 and 44 respectively having vapour ports 45 therein (see Figure 5).

To ensure the supply of water at a temperature and pressure common to the several cone assemblies an inlet water manifold 46 encloses the several nozzles 21, the common pressure water supply entering at 47.

It will be obvious that all general conditions such as temperature and pressure of ejector water, nozzle sizes, vacuum levels and such like, being common in each case, the capacity of the multiple condenser Figures 4 and 5 will be threefold that of either of the condensers shown in Figure 1 or 2.

The multiple manifold condenser can be constructed with any number of nozzles and corresponding cone assemblies to suit the magnitude of the load it is required to carry.

All parts of the apparatus hereinbefore described are constructed of metal.

In operation (Figures 1 and 2) water or other suitable liquid is injected under adequate pressure through inlet nozzle 21. This liquid hereinafter referred to for convenience as water, passes downwardly at high velocity through the aligned orifices 20 of the cone assembly and issues from the Venturi nozzle 26, from whence the water discharges through pedestal pipe 9 and drain pipe connection 11. The jet of water passes en route through both vacuum generating zones 4 and 5.

In passing through the zone orifices 20 the water jet is subject to a grazing and expanding action which ensures the maximum exposure of its component particles and which coupled with its high velocity affects the condensation of vapour and/or ejection of gas.

By connecting the ports 13 and 14 to the units of plant to be exhausted, vacuums are produced in the systems so established.

The only communication between the zones 13 and 14 is by way of the orifice 20 of sealing cone 18c. Since this orifice is continuously sealed by the jet, the vacuum generated during its passage through the top zone 4 is wholly independent of and unaffected by that generated in zone 5.

It is to be remembered that the seal between the two zones 13 and 14 is obtained by the jet passing through the two elongated parallel sides of the throat of the cone 18c. To obtain an effective seal under ordinary conditions it is usually necessary for the said throat to be twice as long as the ordinary ejector cone throat 18. It will be obvious, however, that the length of the throat of the sealing cone will depend on a number of factors amongst which are (a) the velocity of the jet, (b) the load to be disposed of, i. e. vapours and/or gases, and (c) the difference in vacuum between the zones 13 and 14. Where the apparatus is intended to function so that the zone 13 is still under vacuum when that in zone 14 is broken then the throat of the sealing cone 18c must be sufficiently elongated to take care of the difference between the degree of vacuum obtainable in zone 13 and atmospheric pressure in zone 14.

The temperature of the water jet being at its lowest as it issues from nozzle 21, the top zone 4 is employed for exhausting the unit of plant in which the highest level of vacuum is desired. The water which issues from sealing cone 18c, though warmed by the heat absorbed in zone 4, is capable of generating a vacuum in the system connected with zone 5, though not of the same degree as is produced in that connected with zone 4. However, the vacuum generated in the second zone 5 is usually in excess of the degree required, hence in such case I employ snifter valve means 35 to curtail the vacuum to the desired degree. Such snifter valve means 35 may also be employed with the first zone 4, if required to suit the purposes of the operator.

By the use of insulated jacket 17 (Figure 1) on the wall of annular chamber 6 which encloses zone 4, a somewhat better performance may be obtained from the said zone 4 owing to the reduced transfer of heat thereinto from the higher temperature vapour within zone 5.

The apparatus may be readily dismantled for inspection as for instance (Figure 1) by removing the cover plate 7, unscrewing the extended screws 25 and the nut 31, the complete cone assembly can be withdrawn.

The multiple condenser shown in Figure 4 operates in precisely the same manner as do the single jet condensers shown in Figures 1 and 2 except that the load is shared in this case by three ejector assemblies operating in parallel.

Having now explained the nature of the objects of the invention and having specifically described constructions embodying the invention, what I claim is:

1. A device of the type described, for simultaneously producing a plurality of separate degrees of vacuum comprising a set of spaced, axially-aligned cones, flanged at their broader ends, support rods extending through the flanges of said cones to maintain them in aligned and spaced relation to provide tapered openings of proper dimensions between adjacent cones, means for setting off said cones in a plurality of separate chambers disposed one atop the other, and connected with each other solely by the passage provided through said cones, an inlet in the topmost chamber for introducing an activating fluid into the passage through said cones, each of said chambers having an opening for connecting them to apparatus to be subjected to vacuum, and a Venturi-column discharge nozzle aligned with said set of nozzles and disposed in the bottommost chamber, and on which said set of cones and chamber-providing means are mounted for support.

2. A device of the type described, for simultaneously producing a plurality of separate degrees of vacuum, comprising a casing, having an inlet opening therein, a set of spaced, axially-aligned cones disposed vertically of said casing, and having central passages therein aligned with said inlet opening, means for passing a fluid stream through said passages, a cylindrical partition having thermally-insulated side walls, hung interiorly from the region of the top of said casing, and separating said casing into chambers, and encompassing a predetermined number of said cones, so that each of said chambers contains a selected number of cones, and means for separately connecting each of said chambers to apparatus to be subjected to the generated vacuum.

3. A device of the type described, for simultaneously producing a plurality of separate degrees of vacuum, comprising an elongated casing, having an inlet near one end thereof, a set of spaced, axially-aligned cones in said casing the passages of which cones are in communication with said inlet opening in the casing, means setting off said cones in groups of predetermined number of cones to define separate chambers, said casing having openings leading one to each of said chambers for connecting the chambers to apparatus to be evacuated, a discharge nozzle disposed at the discharge end of said casing and aligned with said set of cones, and a pedestal pipe on which said casing is mounted on end, and into which said discharge nozzle opens, said pedestal pipe having an opening to drain.

4. A device of the type described, for simultaneously producing a plurality of separate degrees of vacuum comprising a casing having an inlet opening at one end thereof, a cover plate over said opening, an inlet fluid nozzle in said cover plate, a cylindrical partition slung interiorly of said casing near the top thereof, in spaced relation with said casing, a set of spaced, axially-aligned cones disposed vertically of said casing and having central passages aligned with said inlet nozzle, said partition separating said casing into chambers, and itself encompassing a predetermined number of said cones, so that each of said chambers contains a selected number of cones, and means for separately connecting each of said chambers to apparatus to be subjected to the generated vacuum.

5. A device of the type described, for simultaneously producing a plurality of separate degrees of vacuum, comprising a casing, a plurality of sets of spaced, axially-aligned cones disposed vertically of said casing, the cones of each set having a central passage therethrough, aligned with a corresponding inlet opening in said casing, means for passing a fluid stream through the passages of each set of cones, a partition in said casing separating the latter into chambers, and encompassing a predetermined number of cones of each set of cones, so that each of said chambers contains a selected number of cones in each set thereof, and means for separately connecting each of said chambers to apparatus to be subjected to the generated vacuum.

6. A device of the type described, for simultaneously producing a plurality of separate degrees of vacuum, comprising a casing, a plurality of sets of spaced, axially-aligned cones disposed vertically of said casing, the cones of each set having central passages therethrough, a distributor head at the inlet end of said casing, for distributing condenser fluid to each said set of cones, the passages of each set of cones being aligned with the fluid opening which supplies the same, a partition in said casing separating the latter into chambers, and encompassing a predetermined number of cones to each set of cones, so that each of said chambers contains a selected number of cones in each set thereof, and means for separately connecting each of said chambers to apparatus to be subjected to the generated vacuum.

7. An ejector-condenser for vapors and gases, comprising, in combination, a casing, a partition dividing said casing into a pair of vacuum-generating vapor-condensing chambers, a suction inlet for each said chamber means for introducing a jet of liquid into one of said chambers, a series of apertured axially-aligned guide elements disposed in each chamber, the several series of guide elements likewise being axially aligned with respect to each other, whereby a jet of liquid from said first-mentioned means can flow through the aligned apertures of said elements, said elements being spaced from each other to expose the liquid flowing therethrough to the atmosphere of said casing and to permit contact of said atmosphere of the casing with the liquid passing therethrough to effect the condensation of condensible vapors therein and at the same time produce a vacuum in the spaces between adjacent guide elements, the degree of vacuum being determined by the initial and terminal velocities and temperatures of the liquid and condensible vapors and gases which are passed through said elements together with the number of guide elements in each series, it being possible to obtain widely different degrees of vacuum in the several chambers.

8. An ejector-condenser for vapors and gases, comprising, in combination, a casing, a partition dividing said casing into a pair of vacuum-generating vapor-condensing chambers, a suction inlet for each said chamber means for introducing a jet of liquid into one of said chambers, a series of apertured axially-aligned guide elements disposed in each chamber, the several series of guide elements likewise being axially aligned with respect to each other, each said element having an extending, flanged portion adjacent to and directed towards the inlet end of the condenser, merging into a constricted portion adjacent to and directed towards the outlet end of the condenser, whereby a jet of liquid from said first-mentioned means can flow through the aligned apertures of said elements, said elements being spaced from each other to expose the liquid flowing therethrough to the atmosphere of said casing and to permit contact of said atmosphere of the casing with the liquid passing therethrough to effect the condensation of condensible vapors therein and at the same time produce a vacuum in the spaces between adjacent guide elements, the degree of vacuum being determined by the initial and terminal velocities and temperatures of the liquid and condensible vapors and gases which are passed through said elements together with the number of guide elements in each series, it being possible to obtain widely different degrees of vacuum in the several chambers.

9. An ejector-condenser for vapors and gases, comprising, in combination, a casing, a partition dividing said casing into a pair of vacuum-generating vapor-condensing chambers, a suction inlet for each chamber means for introducing a jet of liquid into one of said chambers, a series of apertured axially-aligned guide elements disposed in each chamber, the several series of guide elements likewise being axially aligned with respect to each other, whereby a jet of liquid from said first-mentioned means can flow through the aligned apertures of said elements, said elements being spaced from each other to expose the liquid flowing therethrough to the atmosphere of said casing and to permit contact of said atmosphere of the casing with the liquid passing therethrough to effect the condensation of condensible vapors therein and at the same time produce a vacuum in the spaces between adjacent guide elements, one said guide element serving as a seal between the pair of chambers and being of length sufficient to provide a liquid seal therebetween capable of sealing those chambers against each other, the degree of vacuum being determined by the initial and terminal velocities and temperatures of the liquid and condensible vapors and gases which are passed through said elements together with the number of guide elements in each series, it being possible to obtain widely different degrees of vacuum in the chambers.

10. An ejector-condenser for vapors and gases, comprising, in combination, a casing, a partition dividing said casing into a pair of vacuum-generating vapor-condensing chambers, a suction inlet for each said chamber means for introducing a jet of liquid into one of said chambers, a series of apertured axially-aligned guide elements disposed in each chamber, the several series of guide elements likewise being axially aligned with respect to each other, whereby a jet of liquid from said first-mentioned means can flow through the aligned apertures of said elements, said elements being spaced from each other to expose the liquid flowing therethrough to the atmosphere of said casing and to permit contact of said atmosphere of the casing with the liquid passing therethrough to effect the condensation of condensible vapors therein and at the same produce a vacuum in the spaces between adjacent guide elements, and a Venturi column disposed coaxially at the end of the last series of guide elements to increase the effective velocity of the jet of liquid, the degree of vacuum being determined by the initial and terminal velocities and temperatures of the liquid and condensible vapors and gases which are passed through said elements together with the number of guide elements in each series, it being possible to obtain widely different degrees of vacuum in the several chambers.

11. An ejector-condenser for vapors and gases comprising in combination, a casing; a partition dividing said casing into a pair of serially-connected, vacuum-generating, vapor-condensing chambers; a suction inlet for each said chamber means for introducing a jet of liquid longitudinally into one of said chambers; a series of axially-bored aligned guide elements disposed in each chamber, the guide elements of each series being coaxial with respect to each other and the several series being coaxial with respect to each other and to said first-mentioned means so that the liquid is common to said elements and passes through the bore thereof, the elements being spaced from each other a distance such that the ratio of exposed area of liquid to the volume thereof is a maximum and to permit maximum area of contact of the atmosphere of a particular chamber with the liquid passing therethrough while at the same time ensuring that a vacuum is created in the spaces between adjacent elements, the maximum degree of vacuum obtainable being determined by the initial and terminal velocities and temperatures of the liquid, and the number of guide elements in each series being sufficient to exhaust the maximum unit volume of fluid from the corresponding chamber; and means provided in desired chambers, acting independently of the other chambers, for admitting external air, upon and as an incident to increase in the vacuum within the chamber beyond a desired value, to restore the vacuum to the desired maximum value.

12. An ejector-condenser for vapors and gases, comprising, in combination, a casing; a partition dividing said casing into a pair of serially-connected vacuum-generating vapor-condensing chambers; a suction inlet for each said chamber means for introducing a jet of liquid longitudinally into one of said chambers; a series of axially-bored aligned guide elements axial with respect to each other and the several series being coaxial with respect to each other and to said first-mentioned means so that the liquid is common to said elements and passes through the bore thereof, the elements being spaced from each other a distance such that the ratio of exposed area of liquid to the volume thereof is a maximum, and to permit maximum area of contact of the atmosphere of a particular chamber with the liquid passing therethrough while at the same time ensuring that a vacuum is created in the spaces between adjacent elements, the cross-sectional area of the bores of the guide elements in each series, and of the successive series of elements, progressively increasing from inlet to outlet, to accommodate the increased cross-sectional area of the jet of liquid as the latter passes through the condenser, the maximum degree of vacuum obtainable being limited by the maximum of the terminal velocities and temperatures of the liquid, and the number of guide elements in each series and the length of path of liquid through the guide elements of that series being sufficient to exhaust the maximum unit volume of fluid which may be expected from the corresponding chamber.

HENRY LAMONT MURRAY.